United States Patent

Stewart et al.

(10) Patent No.: US 9,513,656 B2
(45) Date of Patent: Dec. 6, 2016

(54) VEHICLE PEDAL RESISTANCE AND KICKDOWN ASSEMBLY

(71) Applicants: William Shelby Stewart, Elkhart, IN (US); Murray Kaijala, Elkhart, IN (US); William Walter Wheeler, Middlebury, IN (US); John Jay Gumkowski, Granger, IN (US); John Roger Gietzen, Elkhart, IN (US)

(72) Inventors: William Shelby Stewart, Elkhart, IN (US); Murray Kaijala, Elkhart, IN (US); William Walter Wheeler, Middlebury, IN (US); John Jay Gumkowski, Granger, IN (US); John Roger Gietzen, Elkhart, IN (US)

(73) Assignee: CTS Corporation, Lisle, IL (US)

( * ) Notice: Subject to any disclaimer, the term of this patent is extended or adjusted under 35 U.S.C. 154(b) by 0 days.

(21) Appl. No.: 14/575,573

(22) Filed: Dec. 18, 2014

(65) Prior Publication Data

US 2015/0185756 A1    Jul. 2, 2015

Related U.S. Application Data

(60) Provisional application No. 61/921,958, filed on Dec. 30, 2013.

(51) Int. Cl.
*G05G 5/03* (2008.04)
*G05G 5/06* (2006.01)
(Continued)

(52) U.S. Cl.
CPC ............. *G05G 5/03* (2013.01); *B60K 26/021* (2013.01); *F16H 59/20* (2013.01); *G05G 1/30* (2013.01); *Y10T 74/20636* (2015.01)

(58) Field of Classification Search
CPC ............ G05G 5/06; G05G 5/065; G05G 5/14; G05G 1/30; G05G 1/38; G05G 5/03; H01H 19/11; B60K 26/021; F16H 59/20; Y10T 74/20636
See application file for complete search history.

(56) References Cited

U.S. PATENT DOCUMENTS 6,360,631 B1 * 3/2002 Wortmann ............... G05G 1/30
                                                267/209
6,418,813 B1    7/2002 Lewis
(Continued)

FOREIGN PATENT DOCUMENTS

JP    2005126022 A    5/2005

OTHER PUBLICATIONS

CTS Corporation Vehicle Pedal Resistance and Kickdown Assembly—2004.
(Continued)

*Primary Examiner* — Adam D Rogers
(74) *Attorney, Agent, or Firm* — Daniel Deneufbourg (57) ABSTRACT

A vehicle pedal resistance and kickdown assembly including a plunger moveable in a housing between first and second positions. The plunger defines a recess for a rod, A first spring in the housing biases the plunger in the first position. A second spring retains the rod in the plunger recess in the first position. In one embodiment, the recess in the plunger is an elongate recess in a flat front face of the plunger. In one embodiment, the housing defines an aperture in a to or bottom wall of the housing that has a length greater than the length of the second spring and the second spring is inserted lengthwise into the housing through the aperture. In one embodiment, the second spring is retained in a clip in the housing.

2 Claims, 4 Drawing Sheets

(51) Int. Cl.
*F16H 59/20* (2006.01)
*B60K 26/02* (2006.01)
*G05G 1/30* (2008.04)

(56) References Cited

U.S. PATENT DOCUMENTS

| | | | |
|---|---|---|---|
| 6,626,061 B2 * | 9/2003 | Sakamoto | G05G 1/30 |
| | | | 74/512 |
| 7,404,342 B2 | 7/2008 | Wurn | |
| 8,042,430 B2 | 10/2011 | Campbell | |
| 8,359,947 B2 | 1/2013 | Kaijala | |
| 8,376,098 B2 | 2/2013 | Campbell | |
| 8,806,977 B2 | 8/2014 | Stewart et al. | |
| 2008/0276749 A1 * | 11/2008 | Stewart | G05G 1/38 |
| | | | 74/512 |
| 2011/0100153 A1 * | 5/2011 | Kaijala | G05G 1/38 |
| | | | 74/512 |
| 2014/0090512 A1 * | 4/2014 | Kaijala | G05G 1/38 |
| | | | 74/514 |

OTHER PUBLICATIONS de Beurs, Marco, CTS2732PCT International Application No. PCT/US2014/071626, International Search Report and Written Opinion, Dec. 14, 2015, European Patent Office, Patent Cooperation Treaty.
CTS Corporation Vehicle Pedal Resistance and Kickdown Assembly 2004 (Updated).

* cited by examiner

VEHICLE PEDAL RESISTANCE AND KICKDOWN ASSEMBLY

CROSS-REFERENCE TO RELATED AND CO-PENDING APPLICATION

This application claims the benefit of the filing date and disclosure of U.S. Provisional Patent Application Ser. No. 61/921,958 filed on Dec. 30, 2014 which is incorporated herein by reference as are all references cited therein.

FIELD OF THE INVENTION

This invention pertains generally to a resistance assembly and, more specifically, to a resistance and kickdown assembly for a vehicle accelerator pedal.

DESCRIPTION OF THE RELATED ART

Typical vehicle accelerator pedals in use today are of the electronic rather than mechanical linkage type and include a contacting or non-contacting sensor rather than a mechanical Bowden cable for sensing the position of the accelerator pedal.

The replacement of the Bowden cable with an electronic sensor initially resulted in a poor tactile feel for the operator due to the absence of the Bowden cable which had formerly provided a desired resistance and kickdown feel on the pedal and the foot of the operator. In an effort to duplicate the desirable tactile resistance and kickdown feel of the Bowden cable, electronic pedals have been fitted with various types of resistance and kickdown assemblies including, for example, the resistance and kickdown assembly disclosed in U.S. Pat. No. 6,418,813 issued to Kaijala and assigned to CTS Corporation.

The present invention is directed to a new embodiment of such resistance or kickdown assembly.

SUMMARY OF THE INVENTION

The present invention is directed to a vehicle pedal resistance and kickdown assembly comprising a case including a plurality of walls defining least first and second interior cavities, one of more of the plurality of walls defining first and second apertures in communication with the first and second cavities respectively, a first spring inserted endwise into the first cavity through the first aperture in the one or more of the plurality of walls, a plunger inserted endwise into the first cavity through the first aperture in the one or more of the plurality of walls into a relationship abutting against one of the ends of the first spring and the plunger defining an external recess, the spring biasing a proximal end of the plunger outwardly from the case, a rod inserted endwise into the case through a third aperture defined in another of the walls of the case and into the recess defined in the plunger in a first position of the plunger, and a second spring inserted lengthwise into the second cavity of the case through the second aperture in the one or more of the walls of the case into an abutting relationship against the rod and biasing the rod in the recess, the plunger being movable in the first cavity from the first position in which the rod is located in the recess to a second position in which the first and second springs are compressed and the rod is located outside the recess.

In one embodiment, the first and second apertures are located in a top wall of the case.

In one embodiment, a clip is located in the second cavity of the case, the second spring being wedged in the clip.

In one embodiment, the clip includes a pair of clip arms projecting outwardly from the interior surface of respective opposed side walls of the case.

In one embodiment, the first and second apertures are defined in a top and bottom wall of the case respectively.

In one embodiment, the plunger includes a flat front face and the recess defined in the plunger is an elongate recess defined in the flat front face of the plunger.

In one embodiment, the case is defined by a plurality of walls and at least one of the walls defines an aperture having a length greater than the length of the second spring, the second spring being inserted into the second cavity in the case through the aperture defined in the least one of the walls of the case.

In one embodiment, the aperture is defined in a bottom wall of the case.

In one embodiment, the aperture is defined in a top wall of the case.

In one embodiment, the case includes a clip located in the second cavity of the case, the second spring being wedged in the clip.

There are other advantages and features of this invention which will be more readily apparent from the following detailed description of the embodiment of the invention, the drawings, and the appended claims.

BRIEF DESCRIPTION OF THE DRAWING

In the accompanying drawings that form part of the specification, and in which like numerals are employed to designate like parts throughout the same.

DETAILED DESCRIPTION OF THE EMBODIMENTS

FIGS. 1, 2, 3, and 4 depict a first embodiment of a vehicle pedal resistance and kickdown assembly or module 10 in accordance with the present invention which is adapted to provide an opposing resistance or kickdown force to the foot of the operator of a vehicle. The vehicle pedal can be an accelerator pedal used in a motor vehicle such as for example the vehicle pedal shown in United States Patent Application Publication US 2014/0090512 A1 with the kickdown assembly 10 of the present invention mounted and operable therein in the same manner as the kickdown assembly 98 disclosed in United States Patent Application Publication US 2014/0090512 A1, the contents of which are hereby incorporated herein by reference.

The assembly or module 10 comprises a housing or case 20, In one embodiment, case 20 is formed from machined steel. In another embodiment, case 20 is formed from molded plastic. Case or housing 20 includes a top generally horizontal wail or surface 22, a bottom generally horizontal partial wall or surface 24 opposed, spaced apart from, and generally parallel to the top wall 22, a back vertical rounded or curved wall or surface 26 extending between the back edges of the top and bottom walls 22 and 24, a pair of vertical, opposed, and spaced apart side walls or surfaces 28 and 30 extending between the top and bottom walls 20 and 22 and forwardly from opposed vertical edges of the back wall 26, and a front partial wall or surface 31 extending generally normally downwardly from the front edge of the to wall or surface 22.

The case or housing 20 includes an interior vertical wall 32 (FIGS. 3 and 4) that is positioned in a relationship spaced and generally parallel to the back wall 26 and extends between and in a relationship generally normal to the top and bottom wails 22 and 24. The walls 24 26, 28, 30, 31 and 32 together define a vertical and generally cylindrically shaped first bore or cavity 34 (FIGS. 3 and 4) in the interior of the case or housing 20 that extends between, and in a relationship generally normal to, the to and bottom walls 22 and 24 respectively. The top wall 22 additionally defines an opening or aperture 35 that opens and extends into the vertical bore 34. The opening 35 is sized to allow the coil spring 70 to be inserted endwise therethrough. The cavity 34 has a length and width at least equal to or greater than the length and width of the coil spring 70. The cavity 34 is located and oriented in the housing 20 in a relationship adjacent and parallel to the back wall 26 of the housing 20 and extends the full length of the back wall 26 between the bottom wall 24 and the opening 35 defined in the top wall 22.

The pair of side walls 28 and 30, the top wall 22, and the front partial wall or surface 31 together define a second generally horizontal interior bore or cavity 36 (FIGS. 3 and 4) defined in the interior of the case or housing 20 and extending between the interior wall 32 and the front partial wall 31 in a relationship generally parallel to the top wall 22 and normal to the first vertical bore or cavity 34.

The pair of side walls 28 and 30 include respective front elongate edges extending on an angle between the front edge of the bottom partial wall 24 and the lower edge of the bottom partial wall 31 and together define an opening or aperture 38 in the front of the case or housing 20 that opens and extends into and is in communication with the second bore or cavity 36 in the interior of the case or housing 20. The opening 38 is sized to allow the coil spring 72 to be inserted lengthwise therethrough. The cavity 36 and opening 38 both have a length and width at least equal to or greater than the length and width of the coil spring 72. The cavity 36 is located and oriented in the housing 20 in a relationship adjacent and parallel to the top wall 22 of the housing 20 and extends between the front wall 31 and the cavity 34.

Figures 3, 4:
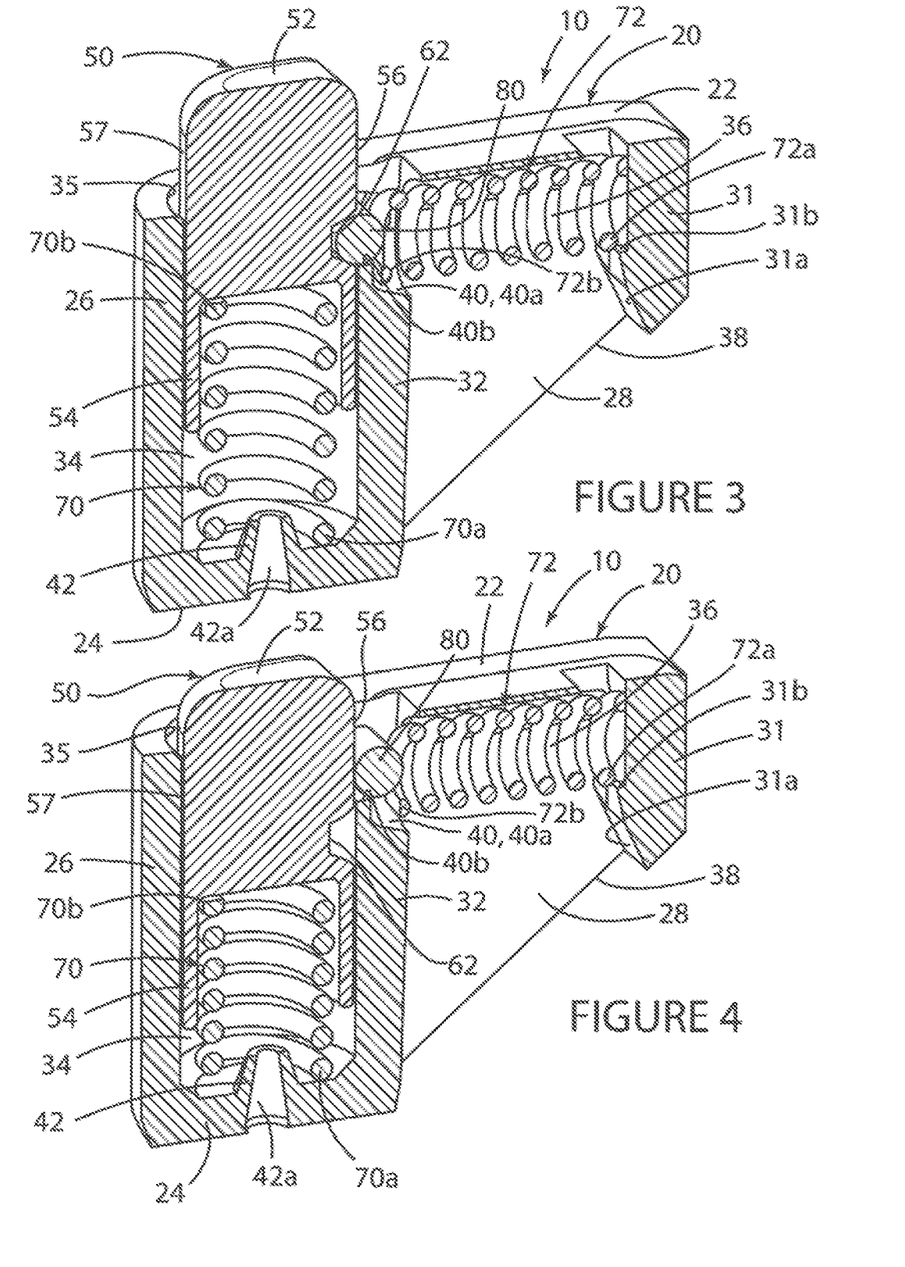
FIG. 3 is a part perspective, part vertical cross-sectional view of the vehicle pedal resistance and kickdown assembly or module shown in FIG. 1.
FIG. 4 is a part perspective, part vertical cross-sectional view of the vehicle pedal resistance and kickdown assembly or module shown in FIG. 3 with the plunger depressed.
Figures 5, 6:
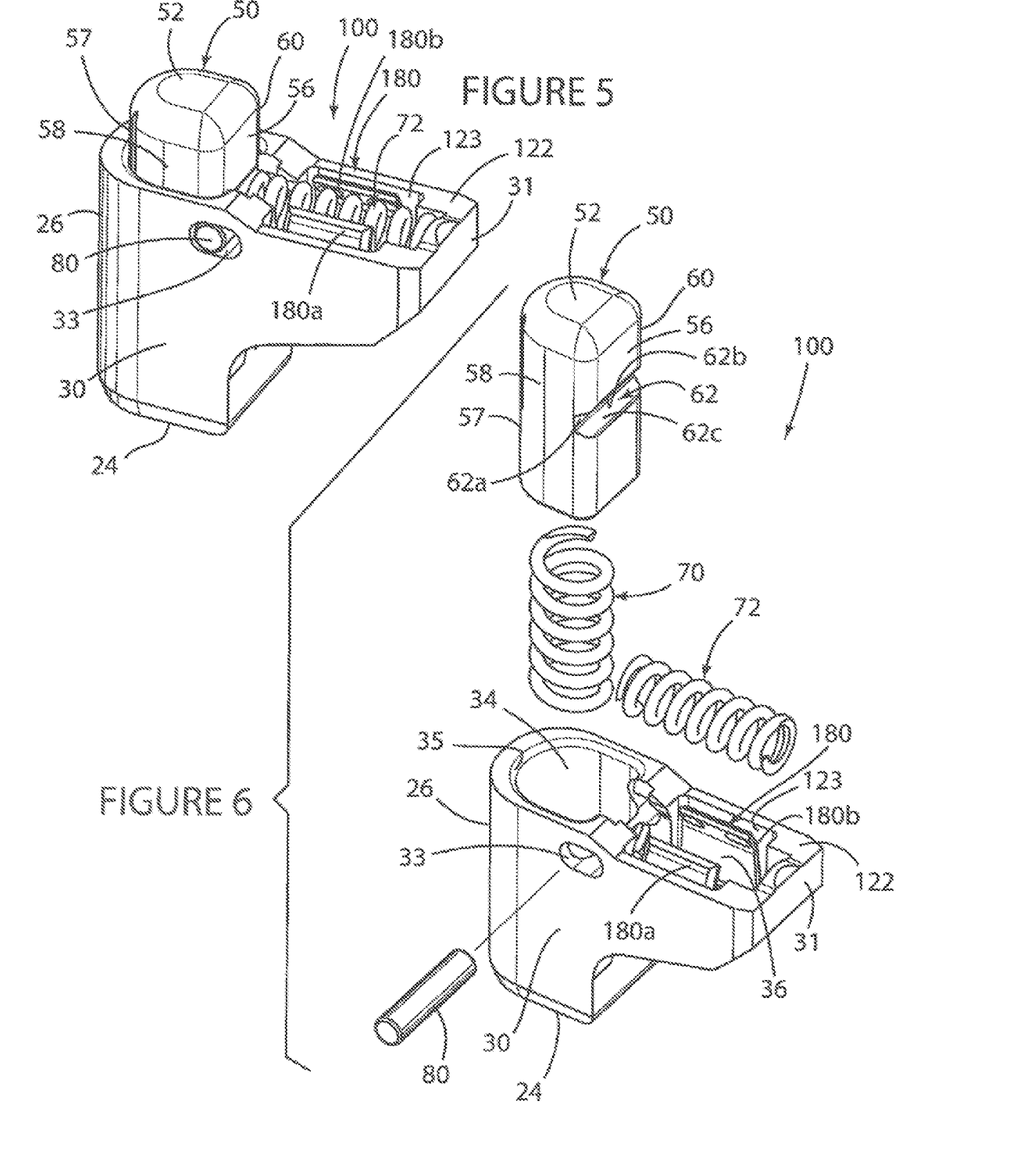
FIG. 5 is a perspective view of another embodiment of a vehicle pedal resistance and kickdown assembly or module in accordance with the present invention.
FIG. 6 is an exploded perspective view of the vehicle pedal resistance and kickdown assembly or module shown in FIG. 5.

As shown in FIGS. 3 and 4, the interior vertical wall 32 includes an interior generally cylindrical surface or spring catch 40 that defines an aperture or through-hole 40*a* in the interior wall 32 that is in communication with the first and second interior cavities 34 and 36. Stated another way, the through-hole 40*a* is located between the two cavities 34 and 36 and defines an opening between the two cavities 34 and 36. The interior cylindrical surface 40 includes and defines an interior generally horizontal ledge or platform 40*b*.

The interior surface of the front partial wall 31 includes a sloped camming surface 31*a* defining a generally horizontal ledge or platform or spring catch or shoulder 31*b* upon which the end of the coil spring 72 is adapted to be seated, The surface 31*a* slopes inwardly from the interior surface of the front wall 31 into the interior of the housing 20.

A generally cone-shaped sleeve 42 extends generally upwardly from the interior surface of the bottom partial wall 24 into the interior of the first bore 34. The sleeve 42 defines an interior through-aperture 42*a* that terminates in respective openings in the bottom partial wall 24 and the top of the sleeve 42.

Figures 1, 2:
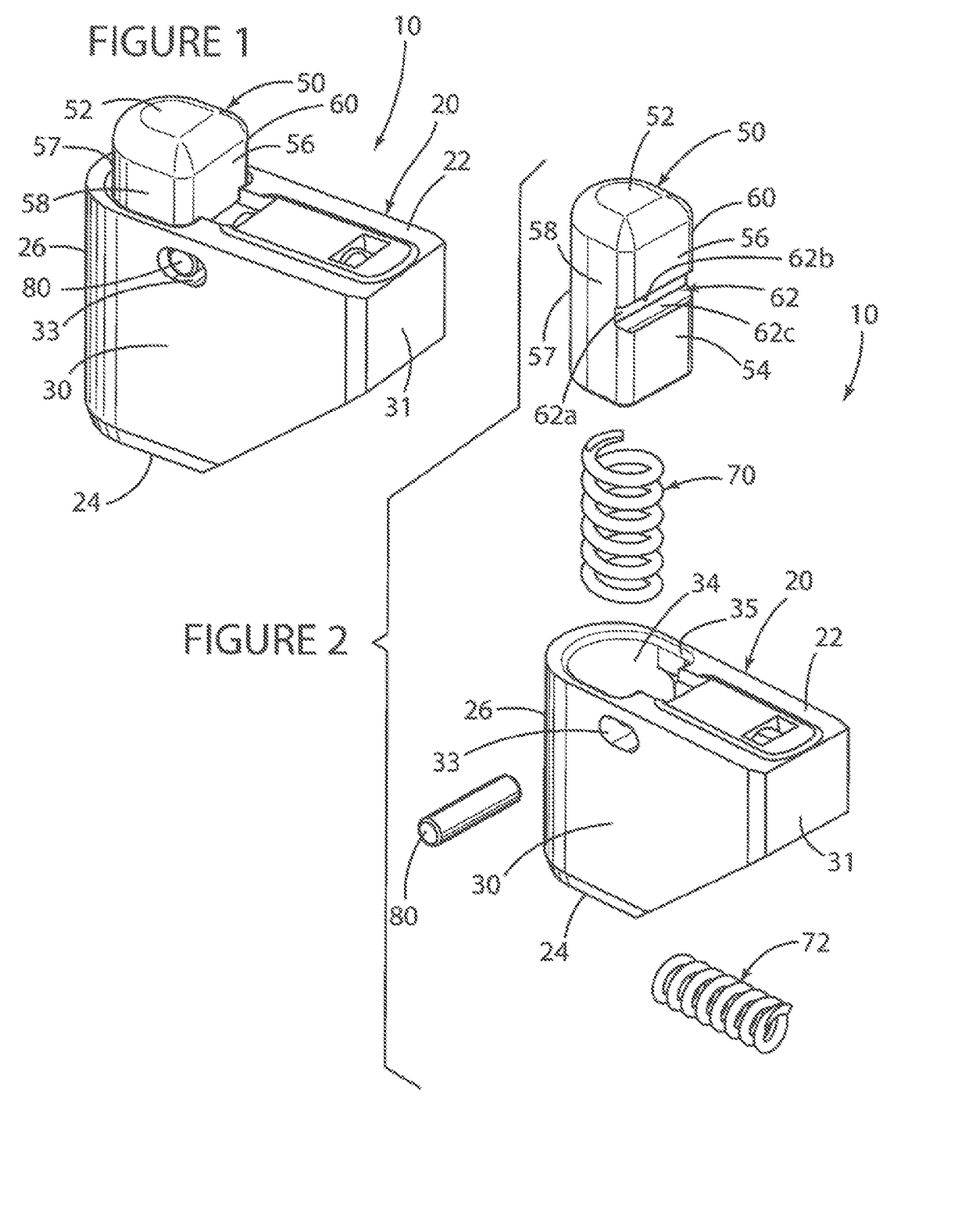
FIG. 1 is a perspective view of a vehicle pedal resistance and kickdown assembly or module in accordance with the present invention.
FIG. 2 is an exploded perspective view of the vehicle pedal resistance and kickdown assembly or module shown in FIG. 1.

Each of the side walls 28 and 30 defines an aperture or through-hole 33 (only the through-hole 33 in the side wall 30 is shown in FIGS. 1 and 2). The through-holes 33 are positioned in the side walls 28 and 30 in an opposed and co-linear relationship and communicate and open into the aperture or through-hole 40*a* defined in the interior vertical wall 31 of the case or housing 20. The through-holes 33 are sized to allow the pin or rod 80 to be inserted endwise therethrough.

Referring to FIGS. 1, 2, 4, and 9, the pedal resistance and kickdown assembly 10 still further comprises an elongate die-cast plunger or piston 50 that, in one embodiment, may be made of un-hardened metal and includes a generally D-shaped top flat surface or proximal end 52 and a bottom or distal end defining a bottom interior recess or cavity or skirt 54. The plunger 50 additionally includes an elongate and vertically extending flat front surface or face 56, a curved back face or surface 57, and a pair of opposed curved and vertically extending side surfaces 58 and 60 that terminate in the front surface 56. The flat front face or surface 56 additionally defines a horizontally extending slot or recess 62 extending across the full width of the front face 56 and terminating in the opposed side surfaces 58 and 60 of the plunger 50.

Referring to FIG. 2 the slot or recess 62 includes a flat base interior surface 62*a* and a pair of sloped or angle side surfaces 62*b* and 62*c* that diverge away from opposed longitudinal edges of the base surface 62*a* and terminate in the exterior front surface 56 of the plunger or piston 50.

Figures 7, 8, 9:
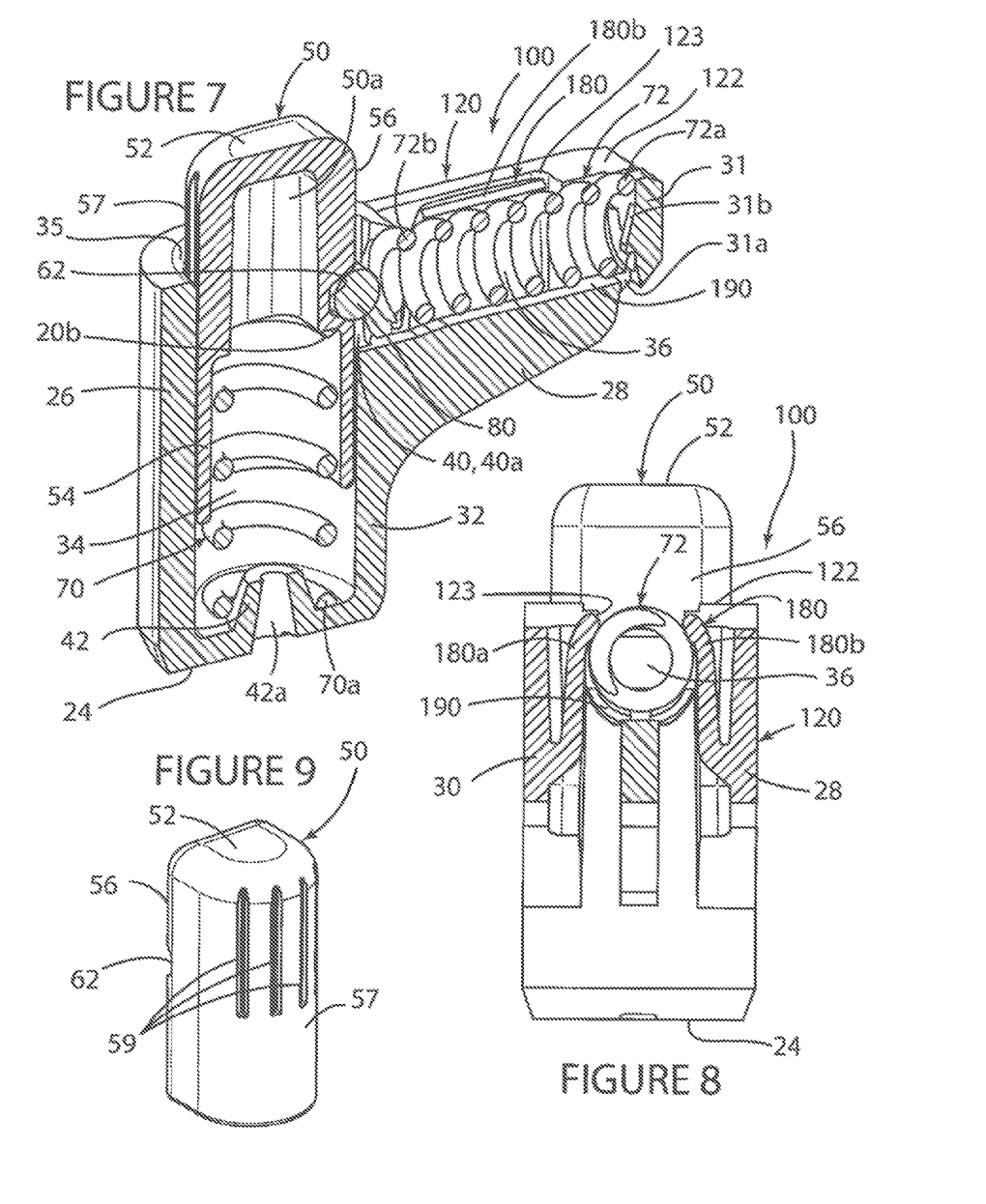
FIG. 7 is a part perspective, part vertical cross-sectional view of the vehicle pedal resistance and kickdown assembly or module shown in FIG. 5.
FIG. 8 is another vertical cross-sectional view of the vehicle pedal resistance and kickdown assembly or module shown in FIG. 5.
FIG. 9 is a perspective view of the plunger of the vehicle pedal resistance and kickdown assembly or module of FIGS. 1 and 5.

Referring to FIG. 9, a plurality of elongate vertical ridges or grooves 59 are formed in and extend into the curved back face or surface 57 of the piston 50, The elongate ridges 59 extend across the width of the back face 57 in a spaced-apart and parallel relationship relative to each other and further in a relationship generally normal to the horizontal top surface 52 of the piston 50.

The plunger 50 is located and mounted in the housing 20 and, more specifically, is located and mounted in the bore 34 of the housing 20 in a relationship co-linear with the bore 34 wherein the curved back face 57 of the plunger 50 is abutted against the interior surface of the exterior vertical curved back wall 26 of the housing 20, the front flat face 52 of the plunger 50 is abutted against the interior surface of the interior vertical wall 32 of the housing 20, the top flat surface or face or proximal end 56 of the plunger 50 extends out of the bore 34 and the housing 20, and the distal end of the plunger 50 is located in the cavity 34 of the case 20.

In the embodiment shown, the plunger 50 extends in the case or housing 20 in a relationship and direction generally normal to the top surface 22 of the housing 20.

Thus, in the embodiment shown, the cavity 34, the spring 70, the plunger 50, and the interior housing wall 32 are all oriented and positioned in a relationship generally normal to the cavity 36 and the spring 72.

The pedal resistance and kickdown assembly 10 still further comprises a pair of elongate biasing elements in the form of respective elongate helical coil springs 70 and 72 (FIGS. 1, 2, 3, and 4).

As shown in FIGS. 3 and 4, the coil spring 70 is located and mo anted in the bore 34 of the housing 20 in a vertical orientation and relationship wherein a first end 70a of the spring 70 is abutted against the interior surface of the bottom wall 24 of the housing 20 in a relationship surrounding the sleeve 42, and the second opposed end 70b of the spring 70 is extended into and located in the recess or cavity 54 defined in the distal end of the plunger 50. Thus, the spring 70 is sandwiched in the bore 34 between the plunger 50 and the bottom well 24 of the housing 20 and is disposed in a relationship and orientation co-linear with the plunger 50.

The spring is located and mounted in the bore 36 of the housing 20 in a horizontal orientation and relationship wherein a first end 72a of the spring 72 is abutted and seated against the spring catch 31b on the interior surface of the front wall 31 of the housing 20 and the opposed second end 72b of the spring 72 is abutted and seated against the spring catch 40 on the interior vertical wall 32 of the housing 20 and is positioned in the through-hole 40a defined between the two cavities 34 and 36. Thus, in the embodiment shown, the coil springs 70 and 72 are disposed and oriented relative to each other in a normal or perpendicular relationship and the coil spring 72 is disposed and oriented in a relationship normal to the plunger 50.

The pedal resistance and kickdown assembly 10 still further comprises elongate and generally cylindrical metal in or rod 80 that is also located and mounted in the interior of the housing 20 and, more specifically, a rod 80 that is located, extends, and is seated horizontally in the slot 62 of the plunger 5r the rest or decent or stop or inactive position and condition of the plunger 50 (FIG. 3). In the rest position or condition of the plunger 50, the end 72b of the coil spring 72 extends through the aperture 40a defined in the interior wall 32 of the housing 20 and is abutted against and biases the rod 80 in the plunger recess 62.

Stated another way, in the embodiment of FIGS. 1, 3, and 4, the rod 80 is sandwiched between the end 72h of the coil spring 72 and the front face 56 of the plunger 50. Moreover, in the embodiment shown, the rod 80 extends in a direction to the direction of travel or movement of the plunger 50 and the coil springs 70 and 72.

The various elements or parts of the pedal resistance and kickdown assembly 10 as described above are located and mounted in the interior of the housing 20 during the manufacturing and assembly of the pedal resistance and kickdown assembly 10 as described in more detail below.

Initially, the spring 70 is inserted endwise or end first into the cavity 34 through the opening or aperture 35 defined in the top wall 22 of the housing 20, i.e., the end 70a of the spring 70 is inserted vertically through the opening 35 defined in the top well 22 of the housing 20, and is extended into the interior of the bore 34 into the relationship as shown in FIGS. 3 and 4 wherein the first end 70a of the spring 70 is abutted against the interior surface of the bottom wall 24 of the housing 20 and surrounds the sleeve 42 extending upwardly from the bottom wall 24 of the housing 20.

Then, the distal end of the plunger 50 is inserted endwise or skirt first vertically through the opening 35 defined in the top wall 22 of the housing 20 and is extended downwardly and linearly into the interior of the bore 34 into the relationship as shown in FIGS. 3 and 4 wherein the second end 70b of the spring 70 is located in the interior of the recess or skirt 54 defined in the distal end of the plunger 50 and the slot or recess 62 defined in the front face 56 of the plunger 50 is located opposite the aperture 40a defined in the interior wall 32 of the housing 20 and in a relationship co-linear with the apertures 33 defined in the respective side walls 28 and 30 of the housing 20.

Then, one of the opposed ends of the pin or rod 80 is inserted horizontally and endwise or end first into and through one of the apertures 33 defined in the respective housing side walls 28 and 30 and the rod 80 is extended horizontally through the interior of the housing 20 and into the relationship as shown in FIGS. 3 and 4 wherein the body of the pin 80 is seated horizontally in the slot 62 of the plunger 50 and the opposed ends of the pin 80 are located in the respective apertures 33 defined in the respective side walls 28 and 30 of the housing 20.

Then, to complete the assembly of the pedal resistance/kickdown assembly 10, the spring 72 is inserted either lengthwise or endwise into the interior of the housing 20 via and through the opening 38 defined in the bottom of the housing 20 and is extended through the interior of the housing 20 and positioned therein in the relationship as shown in FIGS. 3 and 4 wherein the spring 72 is positioned horizontally in the bore 36 of the housing 20 with the first end 72a of the spring 72 abutted and seated against the spring catch 31b on the interior surface of the front partial wall 31 of the housing 20 and the opposed second end 72b of the spring 72 is abutted and seated against the spring catch 40 on the interior housing wall 32 and extends through the aperture 40a in the interior housing wall 32 into abutting contact with the exterior surface of the rod 80.

The plunger 50 is adapted for linear up and down sliding movement in the bore 34 of the housing 20 in response to the application of an external compressive force against the flat proximal end face or surface 52 of the plunger 50 including, for example, in response to the application of a compressive force thereon by the lever arm 68d of the pedal arm 22 of the pedal 10 disclosed in United States Patent Application Publication US 2014/0090512 A1. The spring 70 is naturally biased to urge or move the plunger 50 out of the case 20 and the spring 72 is naturally biased to urge and keep the pin or rod 80 in the slot or recess 62 of the plunger 50 when no external compressive force is being applied to the proximal end face 52 of the plunger 50. The use of a straight recess 62 in the plunger 50 that extends the full width of the flat front face 56 of the plunger 50 provides for a larger line contact, stress, and load distribution area between the respective plunger and rod exterior surfaces and eliminates the need to harden the plunger recess 62.

When a large enough magnitude external compressive force is applied to the proximal end face 52 of the plunger 50 to overcome the natural biasing force of the springs 70 and 72, the spring 70 is compressed which causes the depression of the plunger 50 (i.e., which, in the orientation of the FIGURES, causes the inward or downward vertical linear movement of the plunger 50 into the cavity 34 of the case 20) which in turn moves the pin 80 out of the slot 62 and compresses the spring 72

Stated another way, a compressive force greater in magnitude than the combination of: the pre-set forces exerted by the springs 70 and 72 against the plunger 50 and the friction between the exterior surfaces of the plunger 50 and the interior surfaces of the respective walls of the housing 20 must be applied to the proximal end 52 of the plunger 50 to force the pin or rod 80 out of the piston slot 62. This is referred to as the initial detent force or resistance that must be applied in order to start movement of plunger 50 inwardly into case 20.

As force is further applied to the proximal end 52 of the plunger 50, spring 70 continues to be compressed. Less force is required to move plunger 50 into case 20 after the initial detent force or resistance has been overcome.

The use of the sleeve 42 with a through-aperture 42*a* eliminates the risk of resistance to depression of the plunger 50 from air pressure build up in the cavity 34 by allowing air in the cavity 34 to escape or vent from the cavity 34 to the exterior of the assembly 10 via and through the aperture 42*a* defined in sleeve 42 upon depression of the plunger 50. The ridges 59 are adapted to collect wear debris and also to retain grease that allows for a smooth up and down movement of the plunger 50 between the two housing walls 26 and 32.

The release of the compressive force applied to piston 70 causes spring 70 to decompress and move plunger 50 back to its detent stop position and cause the pin 80, with the assistance of the force applied to the pin 80 by the spring 72, to slip back into the slot 62 in the plunger 50.

With reference to United States Patent Application Publication US 2014/0090512 A1, it is understood that the pedal resistance mechanism 10 generates an opposing force that is transmitted through the pedal arm 22 to the foot of the user or operator of the vehicle. The opposing force is sensed by the user or operator as an increased resistance to depression of the pedal. This increased resistance can indicate to the vehicle operator that the vehicle transmission is near a downshift point were the transmission shifts into a lower gear (i.e., also referred to as the kickdown point or position of the vehicle pedal).

FIGS. 5, 6, 7, and 8 depict another embodiment of a vehicle pedal resistance and kickdown assembly 100 which is identical in structure and function to the vehicle pedal resistance and kickdown assembly 10 except as otherwise described below and thus the elements of the vehicle pedal resistance and kickdown assembly 100 which are identical to the elements of the vehicle pedal resistance assembly 10 have been designated with the same numerals and the earlier description of the structure, orientation, position, and function of such elements with respect to the vehicle pedal resistance assembly 10 is incorporated herein by reference with respect to the vehicle pedal resistance assembly 100.

The vehicle pedal resistance and kickdown assembly 100 differs from the vehicle pedal resistance and kickdown assembly 10 in that the vehicle pedal resistance and kickdown assembly 100 includes a housing or case 120 that includes a top all 122 defining a top aperture or opening 123. The aperture 123 has a length and a width greater than the length and the with of the coil spring 72.

The housing or case 120 of the vehicle pedal resistance and kickdown assembly 100 also differs from the housing or case 20 of the vehicle pedal resistance and kickdown assembly 10 in that the housing or case 120 includes a coil receiving clip or bracket 180 in the interior of the housing 120 that is comprised of a pair of elongate spaced apart flexible and diametrically opposed clip or bracket arms or prongs 180*a* and 180*b* extending outwardly and upwardly through the cavity 36 of the housing 120 from an interior surface of the opposed housing side walls 30 and 28 respectively and terminating in distal clip fingers 180*a* and 180*b* extending outwardly through the aperture 123 defined in the top wall 122 of the housing 120.

The housing 120 also includes an interior elongate horizontal platform 190 (FIGS. 7 and 8) that is located in the cavity 36 of the housing 120 between and spaced from the pair of clip arms 180*a* and 180*b*. The platform 190 is disposed and oriented in a relationship generally normal to the interior wall 32 and in a relationship spaced and parallel to the top wall 122 of the housing 120. Stated another way, and as shown in FIG. 8, the platform 190 is located between the two clip arms 180*a* and 180*b*.

The spring 72 is located in the housing 120 in a relationship seated against the curved exterior top surface of the platform 120 that is shaped to follow the contour of the spring 72 with the clip arms 180*a* and 180*b* also shaped to follow the contour of the spring 72 and located on opposed sides of the spring 72 and adapted to exert a compressive force against the length of the spring 72 for firmly and securely retaining the spring 72 in the clip 180 and the housing 120. In the embodiment shown, the clip arms 180*a* and 180*b* extend and abut the full length of the opposed sides of the spring 72.

The housing 120 also includes a front wall 31 with an interior surface defining a camming surface 31 that slopes and converges inwardly from the opening 123 into the cavity 36.

The plunger 50 in FIG. 7 also differs from the plunger 50 in FIGS. 3 and 4 in that the head of the plunger 50 shown in FIG. 7 also defines a hollow interior 50*a* in communication with the interior of the skirt 54 of the plunger 50.

In accordance with this vehicle pedal resistance and kickdown assembly embodiment 100, the coil spring 72 is adapted to be inserted generally horizontally lengthwise into the housing 120 through the aperture 123 defined in the top well 122 of the housing and into the clip 180 and more specifically into a relationship wherein the spring 72 is located in the cavity 36 of the housing 120, is seated on top of the platform 190 in the cavity 36 of the housing 120, and is wedged and secured between the clip arms 180*a* and 180*b* as described above.

The end 72*a* of the coil spring 72 is adapted to abut and slide down against the camming surface 31*b* when the coil spring 72 is inserted through the opening 123 and is adapted to guide the coil spring 72 into position in the cavity 36 between the two clip arms 180*a* and 180*b*. In the embodiment shown, the clip arms 180*a* and 180*b* are adapted to spring or flex away from each other when the spring 72 is inserted therebetween and to spring or flex back towards each other and into compressive engagement with the opposed sides of the spring 72 when the spring 72 has been fully extended and pushed down into the cavity 36 and clip 180.

The vehicle pedal resistance and kickdown assembly 100 and the elements thereof otherwise function in the same way as the elements of the vehicle pedal resistance assembly 10 and thus the earlier description of the function of the elements of and the vehicle pedal resistance and kickdown assembly 100 is incorporated herein by reference with respect to the vehicle pedal resistance and kickdown assembly 100.

Numerous variations and modifications of the embodiments described above may be effected without departing from the spirit and scope of the novel features of the invention.

It is to be understood that no limitations with respect to the vehicle pedal resistance and kickdown assemblies illustrated herein are intended or should be inferred. It is, of course, intended to cover by the appended claims all such modifications as fall within the scope of the claims.

What is claimed is:

1. A vehicle pedal resistance and kickdown assembly comprising:
   a case including a plurality of walls defining at least first and second interior cavities, one or more of the plurality of walls defining first and second apertures in communication with the first and second cavities respectively;
   a first spring inserted into the first cavity through the first aperture in the one or more of the plurality of walls;
   a plunger inserted into the first cavity through the first aperture in the one or more of the plurality of walls into a relationship abutting against one of the ends of the first spring and the plunger defining an external recess, the spring biasing a proximal end of the plunger outwardly from the case;
   a rod inserted into the case through a third aperture defined in another of the walls of the case and into the recess defined in the plunger in a first position of the plunger;
   a second spring inserted into the second cavity of the case through the second aperture in the one or more of the walls of the case into an abutting relationship against the rod and biasing the rod in the recess, the plunger being movable in the first cavity from the first position in which the rod is located in the recess to a second position in which the first and second springs are compressed and the rod is located outside the recess; and
   a pair of clip arms unitary with the case and projecting outwardly from the second interior cavity of the case, the second spring being wedged between and in contact with the pair of clip arms.

2. A vehicle pedal resistance and kickdown assembly comprising:
   a case including a plurality of was defining at least first and second interior cavities, one or more of the plurality of walls defining first and second apertures in communication with the first and second cavities respectively;
   a first spring inserted endwise into the first cavity through the first aperture in the one or more of the plurality of walls;
   a plunger inserted endwise into tie first cavity through the first aperture in the one or more of the plurality of walls into a relationship abutting against one of the ends of the first spring and the plunger defining an external recess, the spring biasing a proximal end of the plunger outwardly from the case;
   a rod inserted endwise into the case through a third aperture defined in another of the walls of the case and into the recess defined in the plunger in a first position of the plunger; and
   a second spring inserted lengthwise into the second cavity of the case through the second aperture in the one or more of the walls of the case into an abutting relationship against the rod and biasing the rod in the recess, the plunger being movable in the first cavity from the first position in which the rod is located in the recess to a second position in which the first and second springs are compressed and the rod is located outside the recess, the first and second apertures both being located in a first wall of the case, a clip being located in the second cavity of the case, the second spring being wedged in the clip and the clip including a pair of clip arms projecting outwardly from the interior surface of two of the plurality of walls of the case.

* * * * *